United States Patent Office 3,264,304
Patented August 2, 1966

3,264,304
PREPARATION OF PHENANTHROLINE-QUINONES
Balthasar Fischer and Hansjakob Schmid, Basel, and Klemens Scholz, Arlesheim, Switzerland, assignors to Ciba Corporation, New York, N.Y., a corporation of Delaware
No Drawing. Filed Aug. 13, 1963, Ser. No. 301,907
Claims priority, application Switzerland, Sept. 7, 1962, 10,631/62
10 Claims. (Cl. 260—289)

The present invention provides a new process for the preparation of 4:7-phenanthroline-5:6-quinones, especially for the preparation of 4:7-phenanthroline-5:6-quinone of the formula

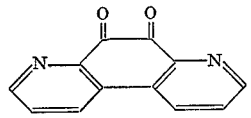

It is known to prepare 4:7-phenanthroline-5:6-quinones from 4:7-phenanthrolines, which carry an etherified hydroxyl group, such as a methoxy group in 5-position or 6-position, by oxidation with nitric acid. The products obtained from the process possess valuable therapeutical properties. For example, 4:7-phenanthroline-5:6-quinone is used as a medicament on account of its antibacterial and antiparasitic action.

However, when the said process was carried out in our works it was found to be technically not practicable because products are formed in the reaction mixture that can cause explosions.

If has been found that the 4:7-phenanthroline-5:6-quinones can be obtained in an advantageous manner without explosion hazard when the etherified hydroxyl group at 5- or 6-position in 4:7-phenanthrolines is split with a hydrohalic acid in the presence of lithium salts and the product so obtained is oxidized with nitric acid to form 4:7-phenanthroline-5:6-quinone.

The etherified hydroxy groups in the phenanthrolines used in the process of the invention are more especially alkoxy groups, such as lower alkoxy groups, advantageously methoxy groups. The said phenanthrolines can also have substituents in the heterocyclic nucleus.

For splitting the ether, the hydrochalic acid more especially hydrochloric acid, hydrobromic acid or hydroiodic acid are advantageously used in concentrated aqueous solution. As lithium salts, there are used advantageously lithium halides, for examples, lithium chloride or lithium bromide. Advantageously there is used 0.1 mol of lithium bromide for each mol of phenanthroline compound.

The oxidation with nitric acid is advantageously carried out with concentrated nitric acid in the presence of sulphuric acid (nitrating acid). In this process it is advantageous to work at a raised temperature, for example, at 50 to 150° C. The oxidation can also be performed continuously.

The starting materials are known or can be made by known methods.

The invention also includes any variant of the present process in which the said process is discontinued after the first stage.

The following examples illustrate the invention.

Example 1

146 g. (0.5 mol) of 6-methoxy-4:7-phenanthroline hydrobromide are introduced into 556 g. of hydrobromic acid of 48% strength and 4.8 g. (0.05 mol) of lithium bromide added. The black-brown solution is heated and kept under reflux for 5 hours. Crystals begin to precipitate after 2 hours under reflux. After termination of the reaction time, the reaction mixture is diluted with 600 ml. of water, 10 g. of active carbon are added, and the whole is stirred for ½ hour to 50 to 55° C. The reaction mixture is then filtered over diatomaceous earth (Hyflo) and the filter residue is washed with a small quantity of water. The pH value is adjusted to 7 with 300 ml. of 10 N sodium hydroxide solution and 100 ml. of 4 N sodium hydroxide solution at 70 to 75° C. in the course of ½ hour, after which the mixture is cooled to 15° C. and suction filtered. The filter residue is again washed twice with one litre of water each time, suction filtered, and the filter residue is dried overnight at 100° C. in vacuo. There are obtained 59 g. (60%) of 6-hydroxy-4:7-phenanthroline melting at 144 to 145° C.

If the above reaction is carried out without adding lithium bromide there is obtained 50 g. (51%) of 6-hydroxy-4:7-phenanthroline melting at 144 to 145° C.

If the reaction is carried out in the manner described above, but keeping the reaction mixture under reflux for 10 hours instead of 5 hours, there is obtained, in the absence of lithium bromide, 68.5 g. (70%) of 6-hydroxy-4:7-phenanthroline melting at 144 to 145° C., and, in the presence of 4.8 g. of lithium bromide there is obtained 78 g. (80%) of 6-hydroxy-4:7-phenanthroline melting at 144 to 145° C.

79 g. of 6-hydroxy-4:7-phenanthroline are introduced into 408 g. of sulphuric acid of 96% strength, while stirring, in which process the temperature rises to 100 to 110° C. 43 ml. of fuming nitric acid are then added dropwise in the course of 5 minutes, while cooling, the temperature being maintained at 110 to 115° C. The reaction mixture is then kept at that temperature for 15 minutes, whereupon it is cooled and poured into a mixture of 400 g. ice and 500 g. of water. When the solution is neutralized, 78 g. of 4:7-phenanthroline-5:6-quinone precipitate.

Example 2

146 g. of 6-methoxy-4:7-phenanthroline-hydrobromide (0.5 mol) are introduced into 177 g. of hydrochloric acid of 36% strength and 4.8 g. (0.05 mol) of lithium bromide added. The black-brown solution is heated and kept under reflux for 5 hours, during which process hydrochloric acid gas escapes. When the reaction is terminated, the solution is dilulted with 600 ml. of water, the clear solution is stirred with 10 g. of active carbon, filtered over diatomaceous earth (Hyflo) and the residue is washed with a small quantity of water. The pH value is then adjusted to 7 in a beaker at 70 to 75° C. with 120 ml. of 10 N sodium hydroxide solution and 120 ml. of 4 N sodium hydroxide solution. The mixture is then cooled to 10 to 15° C., suction filtered, and the residue is washed with a small quantity of water. The filter residue is then washed twice with 500 to 1000 ml. of water each time, suction filtered, and the residue is dried overnight at 100° C. in vacuo. There is obtained 24 g. (25%) of 6-hydroxy-4:7-phenanthroline melting at 144 to 145° C.

If the above reaction is carried out in the absence of lithium bromide there is obtained 6-hydroxy-4:7-phenanthroline in a yield of only about 2%.

If the reaction is carried out in the manner described above, but keeping the reaction mixture under reflux for 10, 20 or 64 hours instead of 5 hours there are obtained, in the presence of 4.8 g. of lithium bromide, 52 g. (53%), 68 g. (70%) or 85 g. (87%) of 6-hydroxy-4:7-phenanthroline melting at 144 to 145° C. In the absence of lithium salts there are obtained 40 g. (41%), 61 g. (63%) or 81 g. (83%) of 6-hydroxy-4:7-phenanthroline melting at 144 to 145° C.

5 g. of 6-hydroxy-4:7-phenanthroline are introduced into 30 ml. of fuming nitric acid at 90° C. There is immediately vigorous evolution of nitrous fumes. The mixture is then stirred for 20 minutes at 90° C. The mixture is then cooled and poured into 200 ml. of water. 3 g. of 4:7-phenanthroline-5:6-quinone precipitate on neutralization.

What is claimed is:

1. In a process for the preparation of 4:7-phenanthroline-5:6-quinones the step which consists in splitting the etherified hydroxyl group at one of positions 5 and 6 in 4:7-phenanthrolines with a hydrohalic acid selected from the group consisting of hydrochloric, hydrobromic and hydroiodic acid in the presence of lithium salts.

2. A process according to claim 1, wherein the hydrohalic acid is used in concentrated aqueous solution.

3. A process according to claim 1, wherein there is used a 5-alkoxy-4:7-phenanthroline as starting material.

4. A process according to claim 3, wherein there is used 5-methoxy-4:7-phenanthroline as starting material.

5. In a process for the preparation of 4:7-phenanthroline-5:6-quinones the step which comprises splitting the alkoxy group in a 5-alkoxy-4:7-phenanthroline with a concentrated aqueous hydrohalic acid selected from the group consisting of hydrochloric, hydrobromic and hydroiodic acid in the presence of about 0.1 mol of lithium bromide for each mol of the phenanthroline compound.

6. A process according to claim 5, wherein 5-methoxy-4:7-phenanthroline is used as starting material.

7. A process for the preparation of 4:7-phenanthroline-5:6-quinones characterized by splitting the alkoxy group of a 5-alkoxy-4:7-phenanthroline with a hydrohalic acid selected from the group consisting of hydrochloric hydrobromic and hydroiodic acid in the presence of a lithium halide and separating, then oxidizing the product so obtained with nitric acid to form 4:7-phenanthroline-5:6-quinones.

8. A process according to claim 7, wherein the oxidation is carried out with concentrated nitric acid in the presence of sulfuric acid.

9. A process for the preparation of 4:7-phenanthroline-5:6-quinone characterized by splitting the methoxy group in 5-methoxy-phenanthroline with a concentrated aqueous hydrohalic acid selected from the group consisting of hydrochloric, hydrobromic and hydroiodic acid in the presence of about 0.1 mol of lithium bromide for each mol of the phenanthroline compound and separating, then oxidizing the product so obtained with concentrated nitric acid in the presence of sulfuric acid.

10. A process according to claim 1 wherein the lithium salt is a member selected from the group consisting of lithium bromide and lithium chloride.

References Cited by the Examiner

FOREIGN PATENTS 688,802  3/1953  Great Britain.

HENRY R. JILES, *Acting Primary Examiner.*

DONALD G. DAUS, *Assistant Examiner.*